UNITED STATES PATENT OFFICE.

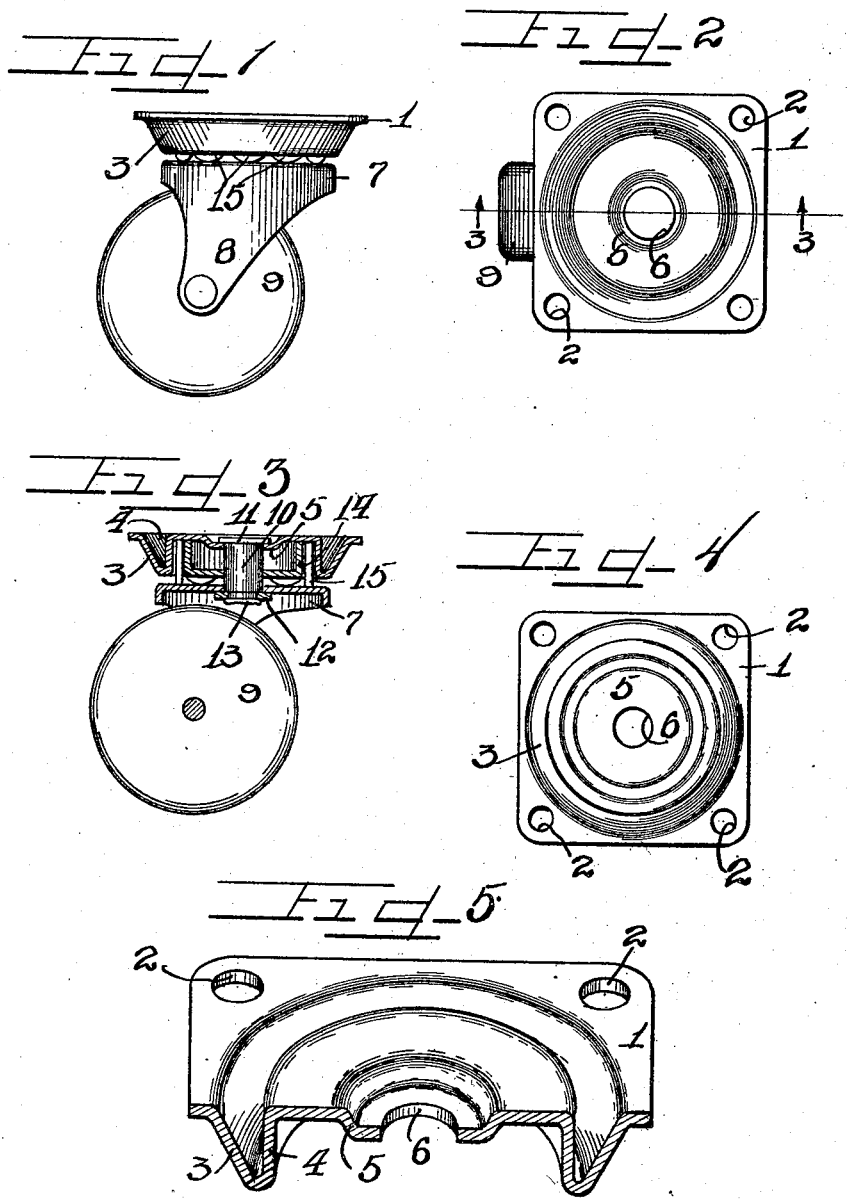

WILLIAM H. NOELTING, OF EVANSVILLE, INDIANA.

CASTER.

1,188,674.  Specification of Letters Patent.  Patented June 27, 1916.

Application filed August 2, 1915. Serial No. 43,110.

*To all whom it may concern:*

Be it known that I, WILLIAM H. NOELTING, a citizen of the United States, and a resident of the city of Evansville, in the county of Vanderburg and State of Indiana, have invented certain new and useful Improvements in Casters; and I do hereby declare that the following is a full, clear, and exact description of the same, reference being had to the accompanying drawings, and to the numerals of reference marked thereon, which form a part of this specification.

This invention relates to an improved type of caster wherein the caster yoke carrying the caster wheel is pivoted upon a caster plate of improved construction and provided with rollers to facilitate easy turning or adjustment of the yoke carrying the caster wheel, and as well affording a much stronger construction.

It is an object therefore of this invention to provide a caster construction embodying the use of an improved type of caster plate having associated therewith a caster wheel yoke and track member to receive rollers interposed between the track member and said plate, together with retaining means for the rollers to maintain the same properly positioned, the entire construction maintained in assembled relation by the caster pintle by which the yoke is pivoted to the caster plate.

It is also an object of this invention to provide a caster construction employing a caster plate adapted to be secured to furniture and flanged or struck downwardly to afford retaining means for roller bearings interposed between the caster plate and the yoke or tracker plate in which the caster wheel is journaled, the tracker plate being pivotally connected by means of a short pintle to the caster plate, with a roller retaining means co-acting with the flanged caster plate to retain the rollers properly disposed within the assembled structure.

It is furthermore an important object of this invention to provide a caster construction embracing a caster plate of improved form shaped to receive a short pintle fitted through a central inwardly struck portion of the plate to afford a flush top surface for easy attachment of the caster to furniture, and further provided with a downwardly struck flange or wall inclosed by which are the roller bearings for the tracker plate of the caster.

It is finally an object of this invention to construct an improved type of roller bearing caster employing the use of a less number of parts than heretofore, and affording a substantial and practical, as well as ornamental structure.

The invention (in a preferred form) is illustrated in the drawings and hereinafter more fully described.

In the drawings: Figure 1 is a side elevation of a device embodying the principles of my invention. Fig. 2 is a top plan view thereof. Fig. 3 is a section taken on line 3—3 of Fig. 2, with parts shown in elevation. Fig. 4 is a bottom plan view of the caster plate detached from the other elements of the structure. Fig. 5 is a fragmentary perspective view of the caster plate shown partly in elevation and partly in section.

As shown in the drawings: The caster plate of the construction consists of an upper rectangular shaped attaching plate 1, provided with apertures 2, at the corners thereof, for attachment to a furniture leg or the like. Near the outer edge of said plate 1, the metal is struck inwardly or downwardly to afford a circular rib or flange having an inclined outer wall 3, and a vertical inner wall 4, as clearly shown in Figs. 3 and 5. A circular portion of said plate 1, is also struck inwardly or downwardly at the central part thereof, and denoted by the reference numeral 5, and is provided with a pintle aperture 6, therethrough. A circular track plate member 7, is provided, having integral yoke arms 8, formed thereon which extend downwardly and support journaled therein at one side of the central axis of the structure, a caster wheel 9. Said track 7, is pivotally connected to the caster plate 1, by means of a short pintle 10, which is inserted through the aperture 6, of the caster plate, an upper flange 11, on said pintle fitting into the downwardly struck portion 5, of the plate flush with the top surface of said caster plate. At the lower end of said pintle 10, a washer 12, is inserted thereover, the pintle being reduced in diameter for the purpose, and the metal of the pintle is flanged over said washer, as indicated by the reference numeral 13, to hold the washer in place and thus maintain all the parts of the structure assembled. Also mounted either stationary or movable on said pintle 10, and disposed between the caster plate 1, and track plate 7, is a cup shaped element or member 14, of diameter slightly less than that of the downwardly struck portion 3—4, of the caster plate, to afford a race for circular disk rollers 15, interposed between the caster plate and the track member 7, to facilitate easy turning of the track member 7, with reference to the caster plate, and to afford a more substantial structure by obtaining an even distribution of the load.

The operation is as follows: The track member 7, is capable of pivotal movement with reference to the caster plate 1, about the pintle 10, and the weight of the body upon which the caster plate 1, is attached, is transmitted to the track plate and thence to the caster wheel 9, through the rollers 15, bearing upon the track plate, so as a consequence adjustment of the caster wheel in moving the furniture is easily effected, said rollers 15, permitting easy adjustment of the parts. The cup member 14, may or may not rotate upon the pintle 10, but this is immaterial, the purpose thereof being merely to afford one wall of a race for the rollers 15.

The construction of the caster plate 1, is unique in that the downwardly struck portion 3—4, affords one wall of the race for the rollers and the downwardly struck central portion 5, permits the pintle 10, to fit flush therein so that the caster structure may be easily attached to any flat surface without necessitating preliminary work thereon to receive the caster. The construction is extremely simple, involving only a few parts, and all are held securely assembled with one another and protected from injury.

I am aware that various details of construction may be varied through a wide range without departing from the principles of this invention, and I therefore do not purpose limiting the patent granted otherwise than necessitated by the prior art.

I claim as my invention:

1. In a device of the class described a rectangular caster plate having attaching apertures at the corners thereof, a circular downwardly struck portion having an inclined and a vertical wall, a centrally downwardly struck and apertured portion to receive a pintle inserted therethrough in flush relation with the top surface of the caster plate, a track member mounted on said pintle, a caster wheel journaled in said track member, a plurality of rollers interposed between said caster plate and said track member, and an inner cup member mounted on said pintle co-acting with the downwardly struck vertical wall of the caster plate to afford a race to confine and maintain said rollers in proper position.

2. A caster plate of the class described comprising an outer circular downwardly struck portion having an inclined and a vertical wall forming a part thereof, and a centrally disposed downwardly struck portion having an aperture at the center thereof.

3. A caster plate of rectangular shape having attaching apertures at the corners thereof, a downwardly struck circular portion having an inclined and vertical wall forming a part thereof, and a centrally disposed downwardly struck circular portion concentric with said first downwardly struck portion and having an aperture at the center thereof.

In testimony whereof I have hereunto subscribed my name in the presence of two subscribing witnesses.

WILLIAM H. NOELTING.

Witnesses:
CHARLES W. HILLS, Jr.,
EARL M. HARDINE.

Copies of this patent may be obtained for five cents each, by addressing the "Commissioner of Patents. Washington, D. C."